United States Patent
Kumar et al.

(10) Patent No.: US 12,489,617 B2
(45) Date of Patent: Dec. 2, 2025

(54) PASSWORD AUTHENTICATION USING CRYPTOGRAPHIC KEY HANDLE-BASED AUTHENTICATION RECORDS

(71) Applicant: HEWLETT PACKARD ENTERPRISE DEVELOPMENT LP, Spring, TX (US)

(72) Inventors: Chaitanya Gali Kumar, Bangalore (IN); Amit Prajapati, Bangalore (IN); Ancitta Alphonse, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 100 days.

(21) Appl. No.: 18/428,461

(22) Filed: Jan. 31, 2024

(65) Prior Publication Data

US 2025/0192999 A1    Jun. 12, 2025

(30) Foreign Application Priority Data

Dec. 12, 2023 (IN) .............................. 202341084771

(51) Int. Cl.
  *H04L 9/08* (2006.01)
(52) U.S. Cl.
  CPC .......... *H04L 9/0863* (2013.01); *H04L 9/0869* (2013.01); *H04L 9/0897* (2013.01)
(58) Field of Classification Search
  CPC .... H04L 9/0863; H04L 9/0897; H04L 9/0894
  See application file for complete search history.

(56) References Cited

U.S. PATENT DOCUMENTS

| 4,924,515 A  | * | 5/1990 | Matyas   | H04L 9/0643 380/280 |
| 6,370,250 B1 | * | 4/2002 | Stein    | H04L 9/3226 380/284 |
| 6,950,523 B1 | * | 9/2005 | Brickell | H04L 9/3236 707/999.009 |
| 7,961,884 B2 | * | 6/2011 | Edgett   | H04L 63/108 380/259 |

(Continued)

OTHER PUBLICATIONS

Trusted Computing Group, "TPM 2.0 Library", available online at <https://trustedcomputinggroup.org/resource/tpm-library-specification/>, 2024, 11 pages.

*Primary Examiner* — Ponnoreay Pich
(74) *Attorney, Agent, or Firm* — Trop, Pruner & Hu, P.C.

(57) ABSTRACT

A process includes receiving credentials associated with a request to access a computer platform. The credentials include a password and a user identification. The process includes determining a key handle and a reference cryptographic digest corresponding to the user identification. The process includes determining a second cryptographic digest corresponding to the user identification. Determining the second cryptographic digest includes providing the key handle and the password to a security processor of the computer platform and initiating an operation by the security processor to apply a keyed-hashing function to the password based on a cryptographic key corresponding to the key handle to provide the second cryptographic digest. The security processor stores the cryptographic key. The process includes regulating access to the computer platform based on a comparison of the second cryptographic digest to the reference cryptographic digest.

7 Claims, 6 Drawing Sheets

(56) References Cited

U.S. PATENT DOCUMENTS

| | | | |
|---|---|---|---|
| 2002/0141575 A1* | 10/2002 | Hird | G06F 21/62 |
| | | | 726/28 |
| 2003/0021417 A1* | 1/2003 | Vasic | H04L 9/3263 |
| | | | 713/155 |
| 2008/0092239 A1* | 4/2008 | Sitrick | H04N 21/8355 |
| | | | 713/193 |
| 2014/0140508 A1* | 5/2014 | Kamath | H04L 9/0822 |
| | | | 380/255 |
| 2018/0367316 A1* | 12/2018 | Cheng | G06F 21/72 |
| 2019/0052467 A1* | 2/2019 | Bettger | H04L 9/0643 |
| 2024/0283645 A1* | 8/2024 | Lavine | H04L 9/0825 |
| 2024/0406010 A1* | 12/2024 | Chotrani | H04L 9/3247 |
| 2025/0192999 A1* | 6/2025 | Kumar | H04L 9/0897 |

* cited by examiner

500

NON-TRANSITORY MACHINE-READABLE STORAGE MEDIUM

504

MACHINE-READABLE INSTRUCTIONS THAT, WHEN EXECUTED BY NETWORK DEVICE, CAUSE NETWORK DEVICE TO:
- RESPONSIVE TO CREATION OF PASSWORD FOR USER IDENTIFICATION:
  - STORE CRYPTOGRAPHIC KEY IN SECURITY PROCESSOR OF NETWORK DEVICE
  - DETERMINE HANDLE USED BY SECURITY PROCESSOR TO REFERENCE CRYPTOGRAPHIC KEY
  - ACCESS REFERENCE CRYPTOGRAPHIC DIGEST DETERMINED BASED ON CRYPTOGRAPHIC KEY AND PASSWORD
  - CREATE AUTHORIZATION RECORD CORRESPONDING TO USER IDENTIFICATION
- STORE, IN AUTHORIZATION RECORD, DATA REPRESENTING USER IDENTIFICATION, REFERENCE CRYPTOGRAPHIC DIGEST AND HANDLE
- RESPONSIVE TO REQUEST ASSOCIATED WITH USER IDENTIFICATION TO ACCESS NETWORK DEVICE:
  - ACCESS AUTHORIZATION RECORD
  - PROCESS REQUEST BASED ON REFERENCE CRYPTOGRAPHIC DIGEST AND HANDLE

FIG. 5

PASSWORD AUTHENTICATION USING CRYPTOGRAPHIC KEY HANDLE-BASED AUTHENTICATION RECORDS

BACKGROUND

A computer platform may have an access control system to regulate access to the platform's resources. A user may provide credentials in association with a request to log into the computer platform. The access control system may authenticate the credentials to verify the user's identity for purposes of determining whether to allow or deny the user any access. The credentials provide a knowledge factor (e.g., a password) that is presumably restricted to the user's knowledge. If the access control system successfully verifies the user's identity based on the provided credentials, then the access control system may regulate the degree of permitted access for the user based on one or multiple other criteria (e.g., role-based permissions associated with the user's account).

BRIEF DESCRIPTION OF THE DRAWINGS

FIG. 5 is an illustration of machine-readable instructions that, when executed by a network switch, cause the network switch to create and use a cryptographic key handle-based password authentication record to authenticate a password according to an example implementation.

DETAILED DESCRIPTION

Figure 1:
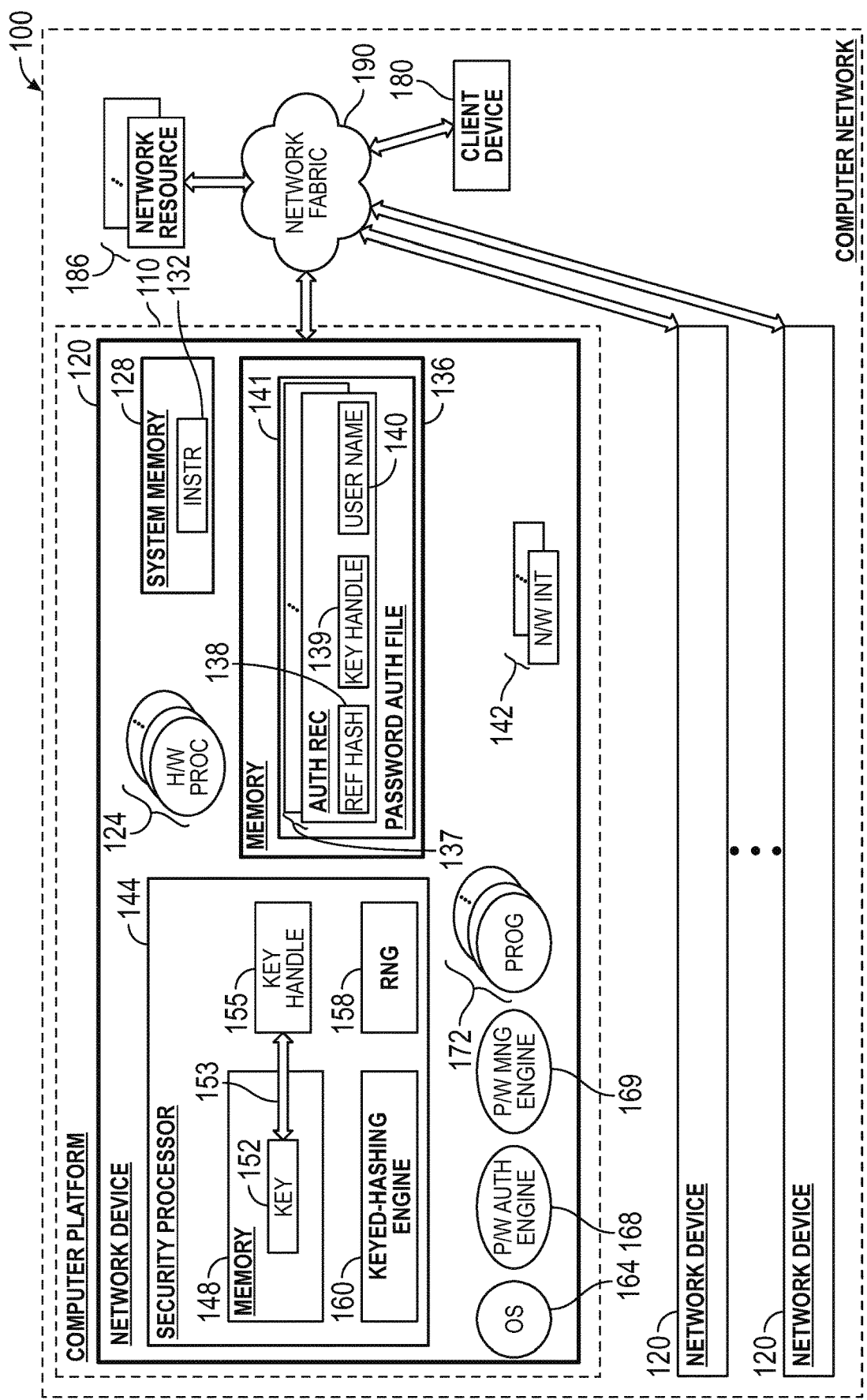
FIG. 1 is a block diagram of a computer network that includes a network device that provides a password authentication solution that uses cryptographic key handle-based password authentication records according to an example implementation.

An operating system of a computer platform may, via user accounts, regulate access to resources of the computer platform. A user account has an associated set of privileges that control the level of access to computer platform resources. From the perspective of a user (e.g., a human or a software entity), a user account may be identified by a name, called a "user name" (or "username"). For its operations, an operating system may identify a user account by a number called a "user ID" (or "UID"). For purposes of an access requestor logging into a user account, the access requestor may provide credentials, such as a user name and a password, which are authenticated by the computer platform. In this context, "authenticating" credentials refers to verifying the identity of the access requestor based on the credentials. The password serves as a knowledge factor, which is known by the account holder (e.g., created by the account holder for the user name according to a record of the computer platform) and is presumably restricted to the account holder's knowledge. The computer platform may include an authentication module (e.g., a pluggable authentication module (PAM)) to verify a password that is provided by an access requestor against the computer platform's record of a password that was created for the user account.

More specifically, to verify a password that is provided by an access requestor, an authentication module may access a password authentication file (e.g., a LINUX shadow file). The password authentication file may contain authentication entries, or records, that correspond to different user names. The authentication module may first identify a particular authentication record of the password authentication file, which corresponds to the user name. The authentication module may then access the identified authentication record and verify the password based on information that is contained in the authentication record.

Because a password authentication file may be relatively unsecure and therefore, may potentially be accessed by a malevolent actor, actual passwords may not be stored in the authentication records. Instead, an authentication record may include a hash (also called a "digest" herein) of the password, with the password being omitted from the record. The authentication module may verify a particular password by determining a hash of the password and then comparing the hash against a reference hash that is stored in the authentication record that corresponds to the user name. The reference hash corresponds to the password that has been created for the user account. A password provided by an access requestor passes verification if the hashes are the same and fails verification if the hashes are different. Because a sophisticated malevolent actor may derive a password from its reference hash (e.g., derive the password using a dictionary-based attack or a rainbow table-based attack), an authentication record may include a randomly-generated or pseudorandomly-generated value called a "salt." For example, a salt along with a reference hash may be stored in an authentication record, so that the input for the hashing function is a concatenation of the salt and the password. Correspondingly, the reference hash is a function of the password that has been created for the user account and the salt. Although the use of a salt may increase the amount of time and computation that are expended by a malevolent actor to learn a password, the addition of a salt may be ineffective against a sophisticated malevolent actor that has significant computing power. Moreover, a salt may significantly increase a time to verify a password.

In accordance with example implementations, a password authentication solution stores cryptographic key handles (herein called "key handles") in respective authentication records. For a given password associated with a user account, the key handle is a pointer, or reference, which identifies a cryptographic key that is used to derive the corresponding reference hash for the password. The relevance of the key handle is restricted to internal operations of a security processor of the computer platform and does not reveal information from which the cryptographic key may be derived outside of the security processor. As such, exposure of the key handle does not reveal or otherwise compromise the corresponding password. As discussed herein, the key handle ties in security-hardened features of the security processor, which prevent the underlying password from being compromised.

In an example, an authentication record may contain data that represents a user identification, such as a user name; a key handle; and a reference hash. The key handle references a cryptographic key that is stored in the security processor. The reference hash is the result of a keyed-hash algorithm that has an input value derived from the password and the cryptographic key. In an example, the security processor may have a keyed-hashing module, or engine, to apply a keyed-hash algorithm based on the cryptographic key and the password to provide the corresponding reference hash. In an example, the security processor may generate the cryptographic key and provide a corresponding key handle that is used internally by the security processor to reference the cryptographic key.

In accordance with example implementations, a computer platform includes a password authentication engine (e.g., a PAM) to verify passwords based on corresponding key handles and reference hashes. In accordance with example implementations, to verify a password, the password authentication engine identifies an authentication record for the corresponding user name and reads data corresponding to the key handle from the identified authentication record. The password authentication engine invokes, via an API call that is directed to the security processor, a keyed-hashing operation that is performed by a keyed-hashing engine of the security processor. The platform authentication engine passes, among other input parameters of the API call, the password and the key handle to the security processor. Responsive to the API call, the security processor identifies the cryptographic key from the key handle, and the keyed-hashing engine of the security processor hashes the password based on the cryptographic key to provide a digest, or hash, that is a returned output of the API call. The password authentication engine reads data corresponding to the reference hash from the identified authentication record and compares the hash returned as an output of the API call to the reference hash. The result of the comparison controls whether the password passes (e.g., the hashes match) or fails (e.g., the hashes do not match) the password verification.

The security processor has features that prevent exposure of the cryptographic key outside of the security processor and prevent unauthorized use of the security processor's keyed-hashing engine with the cryptographic key. In an example of the security features, the security processor does not allow the cryptographic key to be exported or otherwise revealed outside of the security processor. In another example of the security features, the security processor constrains the use of the cryptographic key to a specific authorization value. Therefore, the cryptographic key may not be used in a keyed-hashing operation unless the authorization value is provided in an API call that invokes the operation. Therefore, a malevolent actor may not test a particular candidate password using the keyed-hashing engine of the security processor, even if the malevolent actor gains access to the key handle.

In accordance with example implementations, the computer platform includes a password management engine (e.g., a PAM) that manages password-related information stored in the authentication records. In an example, the password management engine, responsive to a password being created or modified for a user account, stores data in the corresponding authentication record, which represents a key handle and a reference hash that corresponds to the password. For purposes of deriving the key handle and the reference hash, in accordance with example implementations, the password management engine may, via API calls to the security processor, cause the security processor to generate a cryptographic key, store and persist the cryptographic key, and provide (to the password management engine) the key handle for the cryptographic key. Moreover, in accordance with example implementations, the password management engine may, via an API call to the security processor, cause the security processor to apply a key-hashing operation to the password based on the cryptographic key to provide the reference hash.

In an example, the password management engine may, responsive to a user updating an existing password to replace the existing password with a new password, make corresponding updates to the appropriate authentication record. In an example, these actions may include creating a new cryptographic key using the security processor, importing the new cryptographic key into the security processor, receiving a corresponding key handle for the new cryptographic key from the security processor and using the security processor to create a new reference hash. The password management engine may then update the authentication record to replace the old reference hash and the old key handle corresponding to the previous password with the new reference hash and the new key handle. In another example, the password management engine may reuse an existing key handle (and therefore, reuse the same cryptographic key) for an existing password for purposes of changing the existing password to a new password. In this manner, the password management engine may use the security processor to create a new reference hash for the new password without changing the cryptographic key. In another example, the password management engine may, responsive to a user account being removed, or deleted, from the computer platform, remove, from the corresponding authentication record, the reference hash and the key handle. In an example, the removal of the reference hash and key handle may include the password management engine deleting the authentication record.

The password management engine, in accordance with example implementations, undertakes actions to generate a different cryptographic key for each password. The reference hash described herein is unique to each password, and the cryptographic key is stored securely outside of authentication record. These features inhibit a dictionary-based attack or a rainbow table-based attack from being used to derive the password.

In accordance with example implementations, the computer platform may be a network device, such as a managed network switch. The network switch may have one or multiple associated user accounts. A user may, by providing the appropriate credentials, log into a user account for such purposes as configuring the network switch and setting up the network switch to be managed by a network management service.

Referring to FIG. 1, as a more specific example, in accordance with some implementations, a computer platform 110 has an authentication engine 168 that authenticates the identifies of access requestors based on credentials that are provided by the requestors. In accordance with example implementations, for an access requestor to log into a particular user account, the requestor provides a password, which results in a corresponding password verification request being sent to the authentication engine 168. In an example, the access requestor may log into the computer platform 110 via a particular program 172, and the program 172 may send a corresponding password verification request to the authentication engine 168. In this context, a "password verification request" generally refers to an inquiry to determine whether a password provided by an access requestor is the same as the computer platform's record of the password that has been created for the corresponding user account (e.g., the account holder corresponding to a user name associated with the access requestor).

The authentication engine 168, in accordance with example implementations, responsive to a password verification request, determines whether the password associated with the request is the same as the password that the account holder has created for the user account, as reflected by the computer platform's records. In an example, the authentication engine 168 returns a response to a password verification request, indicating whether the verification of a particular password passed or failed. In an example, for a failed verification, the computer platform 110 denies the login, thereby preventing access by the access requestor, via the corresponding user account, to the resources of the computer platform 110. In an example, for a passed verification, the computer platform 110 may next determine the level of access that the computer platform 110 allows to the resources of the computer platform 110 based on one or multiple other criteria (e.g., permissions associated with the user account, whether the password has expired, usage constraints, time-based constraints, as well as other possible criteria).

In the context that is used herein, a "password" generally refers to a sequence of characters used to gain access to one or multiple resources, such as one or multiple resources of the computer platform 110. In examples, a password may be a sequence of numbers; a sequence of alphabet letters; an alphanumeric sequence; a sequence of special characters (e.g., "$," "%" "&" and/or other characters that are neither numbers nor alphabet letters); a sequence of alphabet letters, numbers and special characters; or another combination of characters having one or multiple character types. In examples, a password may be constrained to have a minimum number of characters, a maximum number of characters, character(s) corresponding to certain character types or possess one or multiple other characteristics.

A "resource" of the computer platform 110, in the context that is used herein, refers to a physical or virtual component or service associated with the computer platform 110. In examples, a resource may be an operating system, a memory, a configuration, a virtual machine, a container environment, an application service, an infrastructure service, a particular infrastructure, an application operating environment, a hardware processor, a utility program, a file system, a storage device, a storage array, a storage service, a cache, a virtualization service, a network interface, network virtualization layer, a storage virtualization layer, or another component or service that is part of or provided by the computer platform 110.

The authentication engine 168 may receive a password verification request from any of a number of different sources. In an example, a password verification request may be provided by a program 172 that executes on the computer platform 110. In an example, a program 172 may prompt an access requestor for a password for a particular user account, and responsive to the access requestor providing the password, the program 172 may submit a corresponding password verification request to the authentication engine 168. In examples, a user or a script that executes on the computer platform 110 may provide input through a shell, or user interface, of an operating system 164 of the computer platform 110, which results in the execution of a program 172 that sends a password verification request to the authentication engine 168. In an example, via the shell, a user or script may enter a login command for purposes of beginning a session on the computer platform 110. The login command causes execution of a login utility program 172 that prompts for a password, and the login utility program 172 may communicate a corresponding password verification request to the authentication engine 168 for purposes of determining whether to allow the session.

In another example, for a LINUX operating system, via the shell, a user or a script may enter a substitute user command (also referred to as a "switch user" command or an "su" command) for purposes of substituting, or switching, user accounts. The substitute user command causes execution of a substitute user utility program 172 that prompts for the password for the new user account, and the substitute user utility program 172 may communicate a corresponding password verification request to the authentication engine 168 for purposes of determining whether to allow the switching of user accounts.

In another example, for a LINUX operating system, via the shell, a user or a script may enter a passwd command for purposes of changing the password for the current user account. The passwd command causes execution of a password utility program 172 that prompts for the current password, and the utility program 172 may communicate a corresponding password verification request to the authentication engine 168 for purposes of determining whether to allow the updating of the password.

In another example, a background, or daemon, program 172 may execute on the computer platform 110 for purposes of allowing a requestor on a remote client device 180 to log into the computer platform 110. In an example, the daemon program 172 may be a secure shell daemon (SSHd) server that communicates with an SSH client of the client device 180.

In other examples, a program 172 of the computer platform 110, which is not affiliated with a utility, such as an application or a display manager, may send a password verification request to the authentication engine 168.

The authentication engine 168, in accordance with example implementations, processes a password verification request based on information that is stored in a password authentication file 141. In an example, the password authentication file 141 may be stored in a memory 136 of the computer platform 110. In another example, the password authentication file 141 may be stored remotely with respect to the computer platform 110. In an example, for a LINUX operating system 164, the password authentication file 141 may be a text-based shadow file that has the following file path: /etc/shadow. Access to the password authentication file 141 may be restricted to a root user, in accordance with example implementations.

The password authentication file 141, in accordance with example implementations, includes password authentication entries, or records 137 (herein called "authentication records 137"). In accordance with example implementations, each authentication record 137 is associated with a particular user name and correspondingly, associated with a particular user account. Among other possible information, an authentication record 137 may include fields containing data representing a user name; a reference digest, or hash 138, which corresponds to the password that has been created by the account holder; and a key handle 139.

The key handle 139 references a cryptographic key 152 that is stored in a secure memory 148 of a security processor 144 of the computer platform 110. In the context that is used herein, a "cryptographic key" refers to a sequence of characters associated with a cryptographic algorithm, or function. In an example, a cryptographic key may be a number formed from a concatenation of numbers (e.g., a concatenation of numbers represented in a base sixteen, or hexadecimal, format). In other examples, a cryptographic key may be an alphanumeric sequence, such as a sequence of alphabet letters and numbers; a sequence of letters and special characters (e.g., "%," "&," "$," as other characters that are not alphabet letters or numbers); or a sequence of alphabet letters, special characters and numbers. In an example and as further described herein, the cryptographic key 152 is associated with a cryptographic keyed-hash algorithm. In an example, the keyed-hash algorithm may be a keyed-hash message authentication code (HMAC) algorithm. In an example, the keyed-hash algorithm may be the algorithm that is described in Section 11.4.4 of Part 1 of the Trusted Platform Module Library Specification, Family 2.0, Level 00, Revision 01.59 (November 2019), published by the Trusted Computing Group (hereinafter called the "TPM 2.0 Specification"). In an example, the keyed-hash algorithm may use a hash algorithm from the Secure Hash Algorithm 2 (SHA-2) family of hash algorithms, such as an SHA-256 hash algorithm or a SHA-512 hash algorithm.

The key handle 139 does not contain information that may be used to reveal the corresponding cryptographic key 152 outside of the security processor 144. FIG. 1 depicts a key handle 155 (e.g., a key handle 139 of an authentication record 137, which has been passed to the security processor 144 via an API call) being used inside the security processor 144. The security processor 144 uses the key handle 155 to identify a corresponding cryptographic key 152 (as depicted by association 153) for internal operation(s) of the security processor 144. As further described herein, in accordance with example implementations, via an API call, the authentication engine 168 may pass a key handle and a password (that is being verified) to the security processor 144 for purposes of invoking a keyed-hashing operation by a keyed-hashing engine 160 of the security processor 144. The keyed-hashing operation involves the keyed-hashing engine 160 applying a keyed-hash algorithm, where the inputs to the algorithm are the password and the cryptographic key 152. The security processor 144, responsive to the API call, returns the resulting digest, or hash, that is produced by the keyed-hashing operation.

In the context that is used herein, an application programming interface, or "API," of the security processor 144 refers to a collection of one or multiple software and/or hardware components of the security processor 144, which collectively provide one or multiple functions, or operations, for the security processor 144. The security processor 144 performs an API-related operation responsive to a request, referred to herein as an "API call." Communicating or providing an API call to the security processor 144 may be referred to as invoking a particular function or operation of the security processor 144. An API call may have an associated construct, which defines how parameter(s) are passed via the API call and how parameter(s) are returned as output(s) that result from the security processor 144 performing an operation invoked by the API call. In an example, an API call may have a particular name, or identifier. In an example, one or multiple parameters may be passed as part of an API call corresponding to options and/or arguments (e.g., inputs) for the function or operation invoked by the API call. In accordance with example implementations, the security processor 144 may contain one or multiple registers, which a hardware processor 124 may write with data corresponding to parameters of a particular API call. Moreover, the security processor 144 may include one or multiple registers that contain data representing an output produced by the security processor 144 in response to a particular API call. In accordance with further implementations, API calls and the corresponding results may be communicated between a hardware processor 124 and the security processor 144 via shared memory messaging. A response by the security processor 144 to a particular API call is referred to herein as an "API call response" or an "API response."

The authentication engine 168 verifies the password that is associated with a password verification request by first identifying an authentication record 137 that corresponds to the user name. The authentication engine 168 then reads the key handle 139 from the identified authentication record 137 and submits an API call to the security processor 144 to invoke a keyed-hashing operation. In connection with the API call, the authentication engine 168 passes the key handle 139 and the password being verified, as inputs of the API call, to the security processor 144. Responsive to the API call, the security processor 144 then returns a digest, or hash, corresponding to the keyed hash of the password and the cryptographic key 152 corresponding to the key handle 139. The authentication engine 168 then compares the hash returned by the security processor 144 with a reference hash 139 of the identified authentication record 137. If the hashes match, then the authentication engine 168 provides a response to the password verification request indicating successful verification. If the hashes are not the same, then the authentication engine 168 provides a response to the password verification request indicating that the verification failed.

The computer platform 110, in accordance with example implementations, includes a password management engine 169 (called the "management engine 169" herein) that manages password information-related updates to the password authentication file 141 responsive to password update requests. In general, a "password update request" refers to a directive to modify password information (e.g., information stored in the password authentication file 141) related to particular user account. In an example, a password update request may be directed to creating an authentication record 137. In another example, a password update request may be directed to deleting an authentication record 137. In another example, a password update request may be directed to changing, or modifying, password-related information of an existing authentication record 137. In an example, modifying information of an authentication record 137 may include, in response to the creation of a new password for a user account, replacing an existing reference hash and an existing key handle of the authentication record 137 with a new reference hash and a new key handle. In another example, modifying information of an authentication record 137 may include, in response to the creation of a new password for a user account, retaining an existing key handle of the authentication record 137 (i.e., reusing the same cryptographic key) and replacing an existing reference hash of the authentication record 137 with a new reference hash.

A password update request may originate from any of a number of different sources. In an example, a password update request may be provided by a program 172 that executes on the computer platform 110. In an example, a program 172 may prompt a user to create a new password (e.g., the first password created for the user account or a password to replace the current password). In response to the user creating a new password, the program may submit a password request containing the new password and user name to the management engine 169.

In an example, for a LINUX operating system, via a shell of the operating system 164, a user may enter a passwd command for purposes of changing the password for the user account. The passwd command causes execution of a password utility program 172 that prompts for a new password, and responsive to the new password being provided, the password utility program 172 may communicate a corresponding password update request to the management engine 169.

In another example, a password update request may be associated with a system administrator deleting a user account from the computer platform 110. In another example, a daemon program 172, such as an SSHd server, may provide a password update request responsive to a password change that is submitted from a remote client device 180.

For purposes of servicing a password update request that changes or creates a password, the management engine 169 may perform the following actions. The management engine 169 uses the security processor 144 to generate a new cryptographic key 152 for the new password and provide a new key handle 139 that corresponds to the new cryptographic key 152. Moreover, the management engine 169 uses the security processor 144 to provide a new reference hash 138 that corresponds to the new password and the new cryptographic key 152. The management engine 169 then updates the authentication record 137 to replace the old reference hash 138 and the old key handle 139 with the new reference hash 138 and new key handle 139.

In accordance with example implementations, the management engine 169 uses a random number generator 158 of the security processor 144 to generate the new cryptographic key 152. In accordance with example implementations, the random number generator 158 randomly or pseudorandomly generates a number, and the management engine 169 uses the number as a cryptographic key 152.

In accordance with some implementations, the random number generator 158 may be a true random number generator that generates a random number based on input that is provided by an entropy source. In an example, the random number generator may sample a truly random analog signal, such as a thermal noise signal (e.g., a Johnson-Nyquist noise signal that is provided by a resistor) or an atmospheric noise signal that is received by an antenna. In other examples, the random number generator 158 may process an input representing clock variations, air movements or an input that is provided by another entropy source.

In another example, in accordance with some implementations, the security processor 144 may include a number generator that is not truly random but instead, generates a pseudorandom number. For these implementations, the management engine 169 may use the pseudorandom number as a cryptographic key 152.

In accordance with example implementations, the management engine 169 may, via an API call to the service processor 144, invoke an operation of the random number generator 158 to generate a number, which the security processor 144 returns to the management engine 169 as an output parameter in an API response. In an example, the management engine 169 uses the number that is returned by the security processor 144 as the cryptographic key 152 without further modification. In another example, the management engine 169 may modify the number. For example, the management engine 169 may apply a key derivation function to the number that is returned by the security processor 144 to derive the cryptographic key 152. In another example, the management engine 169 may concatenate the number that is returned by the security processor 144 with other information or apply another modification for purposes of deriving the cryptographic key 152. In another example, the management engine 169 may combine (e.g., concatenate) the number that is returned by the security processor 144 with other information to provide an input to a key derivation function that provides the cryptographic key 152.

In an example, the random number generator 158 may be a digital random number generator (RNG) module that is described in Part 1, Section 11.4.11 of the TPM 2.0 Specification. In another example, the management engine 169 may generate a cryptographic key 152 without using the security processor 144 and then load the cryptographic key 152 into the security processor 144, as described herein. For example, for purposes of generating a cryptographic key 152, the management engine 169 may execute machine-readable instructions corresponding to a cryptographic key generator or a number generator. As another example, the management engine 169 may use a cryptographic processor that is separate from the security processor 144 for purposes of generating a cryptographic key 152. In another example, the management engine 169 may use a graphics processing unit (GPU) to generate a random or pseudorandom number that is used as the cryptographic key 152.

After a cryptographic key 152 is generated, the management engine 169 may load, or import, the cryptographic key 152 into the security processor 144 via an API call. More specifically, in accordance with example implementations, the API call may cause the security processor 144 to load, or import, the cryptographic key 152 as a transient object. In this context, "a transient object" refers to an entity that does not survive a power cycle of the security processor 144. Stated differently, the security processor 144 retains the transient object until power to the security processor 144 is lost. In an example, transient objects of the security processor 144 may be deleted, or erased, when the computer platform 110 is powered down or rebooted. In accordance with example implementations, the security processor 154 responds to an API call to load the cryptographic key 152 with an API response that returns a corresponding transient key handle that references the transient object.

In accordance with example implementations, the management engine 169 follows the API call that imports the cryptographic key 152 with a subsequent API call to the security processor 144 to direct the security processor 144 to persist the loaded cryptographic key 152. In an example, the management engine 169 passes the transient key to the security processor 144 in the subsequent API call, and in response to the API call, the security processor 144 persists the cryptographic key 152 and returns a persistent key handle (referencing the persisted cryptographic key 152) in a corresponding API response. The returned persistent key handle corresponds to the key handle 139. In this context, "persisting" the cryptographic key 152 refers to the cryptographic key 152 being stored in a manner that survives power loss to the security processor 144. Therefore, with the cryptographic key 152 being persisted, the security processor 144 retains the key 152 when the computer platform 110 is powered down or rebooted.

After importing the cryptographic key 152 into the security processor 144 and persisting the cryptographic key 152, the management engine 169 may take actions to generate the new reference hash 138. More specifically, in accordance with example implementations, via an API call, the management engine 169 passes the new key handle 139 and the new password to the security processor 144 for purposes of generating a new reference hash 138. The security processor 144 returns the new reference hash 138 as an output parameter in the corresponding API response.

In accordance with some implementations, the authentication engine 168 and the password management engine 169 may be respective pluggable authentication modules (PAMs). In accordance with some implementations, a program 172 that submits requests to a particular PAM may be compiled with a corresponding PAM library. In accordance with further implementations, the authentication engine 168 and the password management engine 169 may be part of the same PAM.

As depicted in FIG. 1, in accordance with example implementations, the computer platform 110 may be a network device 120, such as a managed network switch. The network device 120 may have one or multiple associated user accounts. A particular user account may be accessed for any of a number of different reasons. In an example, via access provided by a user account, the network device 120 may be provided configuration data, such as data that corresponds to one or multiple configuration files (e.g., yet another markup language (YAML) files). In another example, via access provided by a user account, different settings of the network device 120 may be configured. In examples, these settings may include Quality of Service (QoS) settings, Class of Service (CoS) settings, virtual local area network (VLAN) tagging settings, VLAN untagging settings, ingress bandwidth settings, egress bandwidth settings, Power over Ethernet (POE) settings, as well as different and/or other configurable settings for the network device 120. In an example, via access that is provided by a user account, the network device 120 may be configured to report network telemetry metrics to a network management service. In another example, via access that is provided by a user account, the network device 120 may be set up to report network telemetry metrics to a network management service.

As also depicted in FIG. 1, in accordance with some implementations, the network device 120 may be part of a computer network 100 that includes multiple network devices 120. In accordance with example implementations, each network device 120 may have a security processor 144, authentication engine 168 and management engine 169. Moreover, depending on the particular implementation, different network devices 120 may be associated with different user accounts. In an example, the network devices 120 may correspond to a local branch network (e.g., a local area network (LAN)), such as a network that corresponds to a particular building, group of buildings, campus, edge computer system or datacenter. In an example, the network devices 120 may be part of an edge system to connect edge devices (e.g., servers, clients, Internet of Things (IoT) devices and other devices) to network fabric 190 for purpose of connecting the edge devices to a larger wide area network (WAN), such as the Internet. In another example, the network devices 120 may be associated with multiple local branch networks.

In accordance with example implementations, the network fabric 190 may be associated with one or multiple types of communication networks, such as (as examples) Fibre Channel networks, Compute Express Link (CXL) fabric, dedicated management networks, local area networks (LANs), WANs, global networks (e.g., the Internet), wireless networks, or any combination thereof.

In an example, the network devices 120 may be managed by central network management system (NMS) components that are deployed on one or multiple network resources 186 that are coupled to the network devices 120 via the network fabric 190. In an example, the network resources 186 may be cloud-based resources. In an example, the central NMS components may include a central server provides one or multiple NMS services for the network devices 120. In examples, the NMS services may include firmware update services, network telemetry monitoring services, network troubleshooting services, network performance enhancement services and other services.

In the context that is used herein, a "network device," such as the network device 120, refers to an actual, or physical electronic component, which enables data communication between other components. In an example, a network device may be a switch that operates at level two (L2) of the Open Systems Interconnection (OSI) model to connect components of a computer network together. In another example, a network device may be a level three (L3) switch that connects both components of a computer network together and connects computer networks together. In other examples, a network device may be a gateway, a multicast router, a bridge, a component of a Gen-Z or a Compute Express Link (CXL) network, a processor device, a network interface controller (NIC) or a fabric switch that includes one or multiple of the foregoing devices. A network device may be a wired or wireless device.

In accordance with further implementations, the computer platform 110 may not be a network device. In the context that is used herein, a "computer platform" refers to a processor-based electronic device, which has an associated operating system. In other examples, the computer platform 110 may be a standalone server; a distributed server; a rack-mounted server module; an edge processing, rack-mounted module; a blade server; a blade enclosure containing one or multiple blade servers; a client; a thin client; a desktop computer; a portable computer; a laptop computer; a notebook computer; a tablet computer; a smartphone; a wearable computer; or another processor-based platform.

For the particular implementation that is depicted in FIG. 1, the computer platform 110 has actual, or physical, hardware components, such as one or hardware processors 124; a system memory 128; network ports, or interfaces 142; input/output (I/O) memory; and other hardware devices. In an example, a hardware processor 124 may include one or multiple central processing unit (CPU) cores and/or one of multiple graphical processing unit (GPU) cores. In another example, a hardware processor 124 may include one or multiple semiconductor CPU packages (or "sockets"). In another example, a hardware processor 124 may include one or multiple GPU packages. In an example a hardware processor 124 may execute machine-executable instructions, such as machine-readable instructions 132 that are stored in the system memory 128, for purposes of providing one or multiple software components of the computer platform 110, such as the authentication engine 168 and/or the management engine 169. In another example, a hardware processor 124 may be a hardware circuit that does not execute machine-executable instructions, such as an application specific integrated circuit (ASIC), field programmable gate array (FPGA), programmable logic device, or other hardware dedicated to providing one or multiple functions (e.g., functions related to the authentication engine 168 and/or management engine 169) for the computer platform 110.

The system memory 128 includes non-transitory storage media that may be formed from semiconductor storage devices, memristor-based storage devices, magnetic storage devices, phase change memory devices, a combination of devices of one or more of these storage technologies, and so forth. The system memory 128 may represent a collection of memories of both volatile memory devices and non-volatile memory devices.

In examples, the operating system 164 may be a LINUX operating system, a WINDOWS operating system, a MAC operating system, a FREEBSD operating system, a hypervisor (e.g., an ESXi, KVM or Hyper-V hypervisor) or another operating system.

In accordance with example implementations, the computer platform 110 may have virtualization technology for purposes of providing one or multiple hardware abstractions. In an example, the computer platform 110 may have a hypervisor that provides a virtual machine in which the operating system 164, the authentication engine 168, the management engine 169 and programs 172 are located. In another example, the computer platform 110 may have a container engine that provides a container environment (e.g., a single container, a container pod, or a cluster of container pods) in which the authentication engine 168, the management engine 169 and programs 72 are located. In another example, the operating system 164, the authentication engine 168, the management engine 169 and programs 172 may execute on bare metal.

In accordance with some implementations, the security processor 144 may provide trusted computing operations for the computer platform 110 for purposes of ensuring that the computer platform 110 consistently behaves in expected ways. As examples of trusted computing operations, the security processor 144 may generate cryptographic keys; store security artifacts (e.g., cryptographic keys and certificates); access security artifacts; erase security artifacts; store integrity measurement digests; provide signed integrity measurement digests for remote attestation; encrypt data; and decrypt data. The security processor 144 may provide a flexible access control mechanism based on policies, which may provide for sealing, such as sealing cryptographic keys to certain integrity measurement digest states (e.g., bind a key encrypting key of a storage device to a set of integrity measurements); unsealing cryptographic keys; or any other sealing-related function. As other examples, the security processor 144 may provide nonces for cryptographic communications; sign certificates; and provide random or pseudorandom numbers. The trusted computing operations may also include operations to configure the security processor 144 and operations to own the security processor 144.

The security processor 144, in accordance with example implementations, is an actual, or physical component, such as a hardware device in the form of a semiconductor package (or "chip") that is mounted to a motherboard of the computer platform 110. The memory 148 may be a secure memory, such as a non-volatile random access memory, or "NVRAM." In an example, the memory 148 may store data representing cryptographic artifacts other than the cryptographic keys 152, such as sealed cryptographic keys, certificates, public keys, private keys, and so forth. Moreover, in another example, the memory 148 may store data representing measurement digests. The security processor 144 may be designed according to industry standards to provide hardware-based, security functions while also resisting tampering and malicious software.

In accordance with example implementations, the security processor 144 may be a trusted platform module (TPM). In examples, the security processor 144 may perform one, multiple or all of the trusted computing operations that are described in the TPM 2.0 Specification. In accordance with further implementations, the security processor 144 may perform one or multiple trusted computing operations that are not described in the TPM 2.0 Specification.

In accordance with further implementations, the security processor 144 may be a virtual TPM (vTPM). Moreover, in accordance with further example implementations, the security processor 144 may be a firmware TPM (fTPM).

The security processor 144 may have one or multiple "key hierarchies." In the context that is used herein, a key "hierarchy" refers to a tree-like organization of key-related objects, where the objects are linked by parent-child relationships, and the organization has an origin, or beginning, which may be referred to as a "root node." In accordance with example implementations, a given cryptographic key of a key hierarchy may be a child of another object (the parent) of the key hierarchy. In an example, the root node of a key hierarchy may correspond to a persistent seed. In this context, the seed being "persistent" refers to the seed surviving a power cycle of the security processor 144. The security processor 144 may derive one or multiple non-persistent cryptographic keys (also called "transient" cryptographic keys) of the hierarchy on each power up of the security processor 144. In an example, a key hierarchy may include one or multiple persistent cryptographic keys. In an example, a child cryptographic key may be derived from its corresponding parent cryptographic key. In another example, a child cryptographic key, such as a cryptographic key that is imported into the security processor 144 and associated with a particular parent cryptographic key, may be not derived from the parent cryptographic key.

A cryptographic key of a key hierarchy may be internally referenced by the security processor 144 using a corresponding key handle, such as a key handle 139 provided to the security processor 144 via an API call, as discussed herein. In accordance with example implementations, the security processor 144 may control the use or access of a particular cryptographic key through the use of an authentication value that is associated with the cryptographic key. The authentication value serves as a key password restricting the use of the cryptographic key to a requestor that provides the authentication value. In an example, a requestor, such as the authentication engine 168 of the management engine 169, may pass the authentication value as a parameter in an API call for an operation of the security processor 144 that uses the cryptographic key as an input.

In an example, the authentication engine 168 may import cryptographic keys corresponding to user passwords into a platform key hierarchy (also called a "platform hierarchy") of the security processor 144. In accordance with example implementations, the platform hierarchy is associated with the platform manufacturer, and the use of the platform hierarchy is authorized via a platform hierarchy authorization value that may be set by firmware of the network device 120 during the network device's boot. In addition to cryptographic keys corresponding to user passwords, the platform hierarchy may store a variety of different cryptographic keys, such as, for example, keys that are stored and used by firmware (e.g., Unified Extensible Firmware Interface (UEFI) services) of the network device 120. In another example, the authentication engine 168 may import cryptographic keys corresponding to user passwords into a key hierarchy (e.g., a storage hierarchy) of the security processor 144 other than a platform hierarchy.

As used here, an "engine" can refer to one or more circuits. For example, the circuits may be hardware processing circuits, which can include any or some combination of a microprocessor, a core of a multi-core microprocessor, a microcontroller, a programmable integrated circuit (e.g., a programmable logic device (PLD), such as a complex PLD (CPLD)), a programmable gate array (e.g., field programmable gate array (FPGA)), an application specific integrated circuit (ASIC), or another hardware processing circuit. An "engine" can refer to a combination of one or more hardware processing circuits and machine-readable instructions (software and/or firmware) executable on the one or more hardware processing circuits. In accordance with some implementations, one or multiple engines of the network device 120, such as the authentication engine 168 and/or the management engine 169, may be formed by one or multiple hardware processors 124 executing machine-readable instructions 132.

In the context that is used herein, a "hash" (which may also be referred to by such terminology as a "digest," "hash value," or "hash digest") is produced by the application of a cryptographic hash algorithm, to an input value. A cryptographic hash algorithm receives an input value, and the cryptographic hashing algorithm generates a hexadecimal string (the digest, or hash) to match the input value. In an example, the input value may include a string of data (for example, a data structure in memory denoted by a starting memory address and an ending memory address). In such an example, based on the string of data, the cryptographic hash algorithm outputs a hexadecimal string (the digest, or hash). Any minute change to the input value alters the output hexadecimal string. In examples, the cryptographic hash function may be a secure hash algorithm (SHA), a Federal Information Processing Standards (FIPS)-approved hash algorithm, a National Institute of Standards and Technology (NIST)-approved hash algorithm, or any other cryptographic hash algorithm. In some examples, instead of a hexadecimal format, another format may be used for the string.

In the context that is used herein, a "keyed-hash algorithm" refers to a function that uses a cryptographic hash algorithm (e.g., an SHA, a FIPS-approved hash algorithm, an NIST-approved hash algorithm or other hash algorithm) to generate a digest, or hash, based on a cryptographic key and a message input. The keyed-hash algorithm derives an input for the cryptographic hash algorithm from the cryptographic key and the message input.

The keyed-hash algorithm may derive a digest, or hash, using a single pass or multiple iterations of the cryptographic hash algorithm. In an example, a keyed-hash algorithm may form an input value based on a concatenation of the cryptographic key and the message input, and the keyed-hash algorithm may provide the input value to a cryptographic hash algorithm that provides a digest, which is the output, or result, of the keyed-hash algorithm. In another example, a keyed-hash algorithm may form an input value based on a concatenation of a key derived from the cryptographic key and the message input, and the keyed-hash algorithm may provide the input value to a cryptographic hash algorithm that provides a digest, which is the output, or result, of the keyed-hash algorithm. In another example, a hash-based message authentication code (HMAC) keyed-hash algorithm derives a first key (also called "an inner key") and a second key (also called an "outer key") from the cryptographic key. In a first iteration, or pass (also called the "inner pass"), of the HMAC keyed-hash algorithm, the first key and a message input are combined to provide a first input value to a cryptographic hash algorithm, which provides a first digest (also called the "inner digest result"). In a second iteration, or pass (also called the "outer pass"), of the HMAC keyed-hash algorithm, the second key and the first digest are combined to provide a second input value to the cryptographic hash algorithm, which provides a second digest, which is the output, or result, of the HMAC keyed-hash algorithm. The output of the HMAC keyed-hash algorithm may be referred to as an HMAC.

Depending on the particular implementation, a cryptographic hash algorithm and/or a keyed-hash algorithm may be performed by the execution of machine-readable instructions (i.e., performed in software), by dedicated hardware that does not execute machine-readable instructions, or by a combination of machine-readable instruction execution and dedicated hardware.

Figure 2:
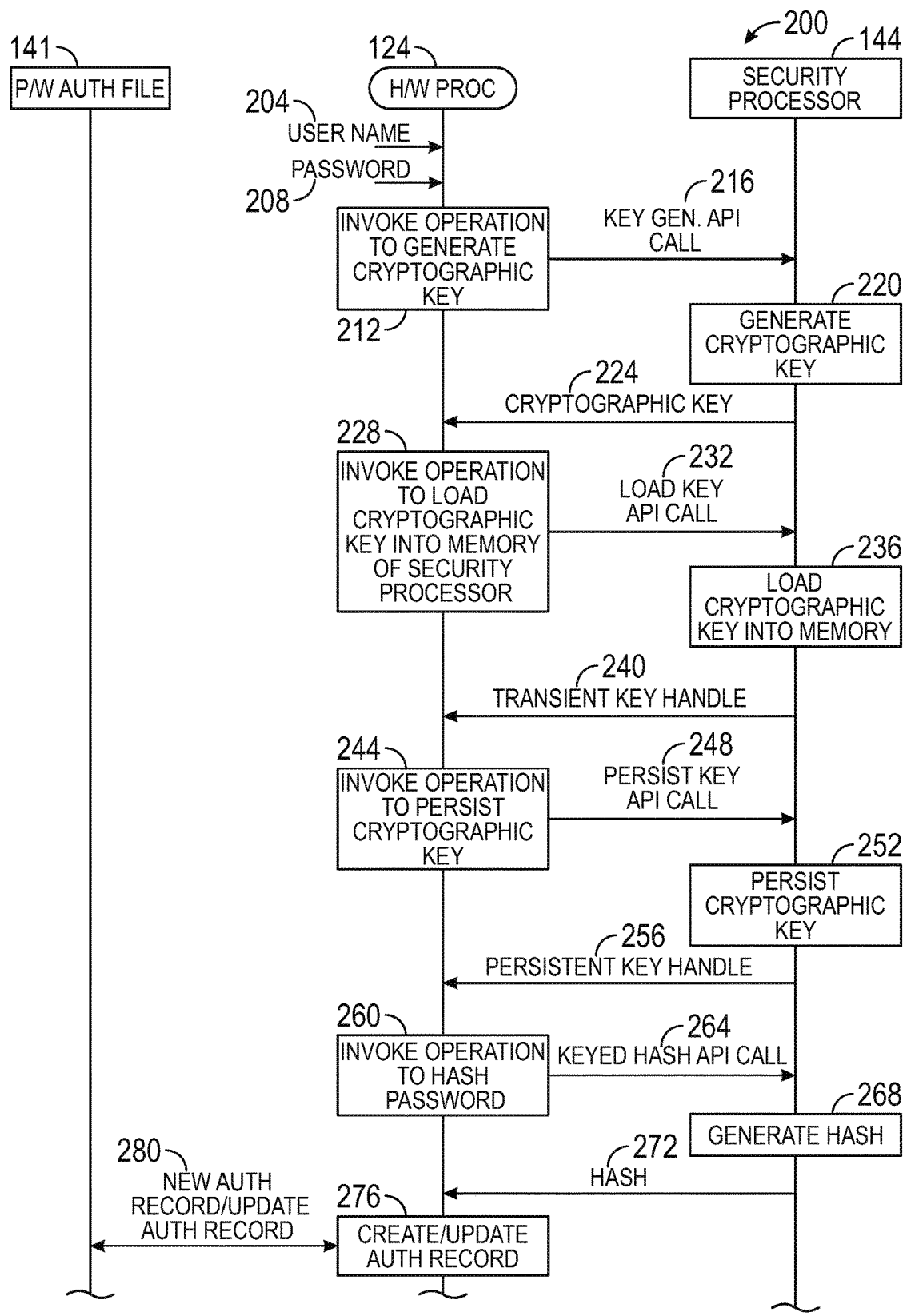
FIG. 2 is a flow sequence diagram depicting communications and actions of a hardware processor and a security processor to create or update a password authentication record with a cryptographic key handle and a hash of a password according to an example implementation.

FIG. 2 is a sequence flow diagram 200, in accordance with example implementations, depicting a sequence of actions and communications involved in updating a password responsive to a password update request. FIG. 2 specifically depicts actions and communications associated with a hardware processor 124 and a security processor 144. In an example, to perform the actions and undergo the communications depicted in FIG. 2, the hardware processor 124 may execute machine-readable instructions that are associated with a password management engine, such as the management engine 169 of FIG. 1.

Referring to FIG. 2, the hardware processor 124 accesses a user name and a new password 208. In an example, the hardware processor 124 may receive data representing the user name and the new password 208 in association with a password update request. The hardware processor 124 invokes, as depicted at 212, an operation of the security processor 144 to generate a cryptographic key for the new password 208.

In accordance with further example implementations, the hardware processor 124 may generate the cryptographic key without using the security processor 144. In an example, the hardware processor 124 may generate the cryptographic key by executing machine-readable instructions. In another example, the hardware processor 124 may generate the cryptographic key using a cryptographic processor (e.g., a component of the hardware processor 124 or a component separate from the hardware processor 124) other than the security processor 144.

For implementations in which the hardware processor 124 generates a cryptographic key for the new password 208 using the security processor 144, the hardware processor 124 may provide an API call, or request, 216 to the security processor 144. In an example, assuming that the security processor 144 processes API calls in accordance with the TPM 2.0 Specification, the API call 216 may be a TPM2_GetRandom( ) API call having TPM2B_Digest as the key type being passed as an option. As depicted at 220, the security processor 144, responsive to the API call 216, generates a cryptographic key 224. In accordance with example implementations, for this purpose, the security processor 144 returns a random number that the hardware processor 124 uses as the cryptographic key 224. In accordance with further implementations, the security processor 144 may return a random number, which the hardware processor 124 further processes to generate the cryptographic key 224. In an example, the hardware processor 124 may apply a key derivation function to a random number returned from the security processor 144. In another example, the hardware processor 124 may concatenate the random number returned from the security processor 144 with a prefix and/or suffix to form the cryptographic key 224.

After the cryptographic key is generated, the hardware processor 124 may, in accordance with example implementations, invoke an operation to load the cryptographic key into a memory of the security processor 144, as depicted at 228. More specifically, for this purpose, in accordance with example implementations, the hardware processor 124 provides an API call 232 to load, or import, the cryptographic key into the security processor 144. In an example, assuming that the security processor 144 processes requests in accordance with the TPM 2.0 Specification, the API call 232 may be a TPM2_LoadExernal( ) API call with the random number (the cryptographic key) being loaded as a child of an arbitrary parent of the platform hierarchy of the security processor 144. In response to the API call 232, the security processor 144 loads the cryptographic key into its memory, as depicted at 236, and returns a transient key handle 240 for the cryptographic key. The transient key handle 240 references the loaded cryptographic key.

After the cryptographic key is imported into the security processor 144, the hardware processor 124 may, as depicted at 244, invoke an operation of the security processor 144 to persist the cryptographic key that is stored in the memory of the security processor 144. For this purpose, in accordance with example implementations, the hardware processor 124 provides an API call 248 to the security processor 144 to persist the loaded cryptographic key. In an example, assuming that the security processor 144 processes requests in accordance with the TPM 2.0 Specification, the API call 248 may be a TPM2_EvictControl( ) API request that passes the transient key handle as an argument and passes an authentication value as an option. The authentication value serves as a password for the cryptographic key. The security processor 144 persists the cryptographic key, as depicted at 252, and returns a persistent key handle 256 in the corresponding API response.

After the cryptographic key is persisted, the hardware processor 124 may, as depicted at 260, invoke an operation of the security processor 144 to hash the new password 208 based on the associated cryptographic key that is stored in the security processor 144. For this purpose, the hardware processor 124 may provide a keyed-hash API call 264 to the security processor 144. In an example, assuming that the security processor 144 processes requests in accordance with the TPM 2.0 Specification, the API call 264 may be a TPM2_HMAC( ) API call that passes the new password 208 as an argument and passes the authentication value, persistent key handle and a cryptographic hashing algorithm identification as options. Responsive to the API call 264, as depicted at 268, the security processor 144 provides an API response that returns a digest, or hash 272, which corresponds to the new password 208.

The hardware processor 124, at this point, has the new key handle 256 and the new hash 272 for the new password 208. As depicted at 276, the hardware processor 124 may then create a new authentication record or update an existing authentication record (depending on whether the authentication record exists) with the new key handle 256 and new reference hash 272, as depicted at 280.

In another example, if an existing password is being changed to the new password 208, then, in accordance with some implementations, the existing key handle and the corresponding existing cryptographic key may be reused. For this variation, the sequence 200 omits the actions 212 to 252 and begins by, at 260, invoking an operation to hash the new password 208. The security processor 144 may then generate the new reference hash 272, as depicted at 268. The hardware processor 144 may then update the authentication record, as depicted at 276, with the new reference hash 272 and without modifying or replacing the existing key handle of the authentication record.

Figure 3:
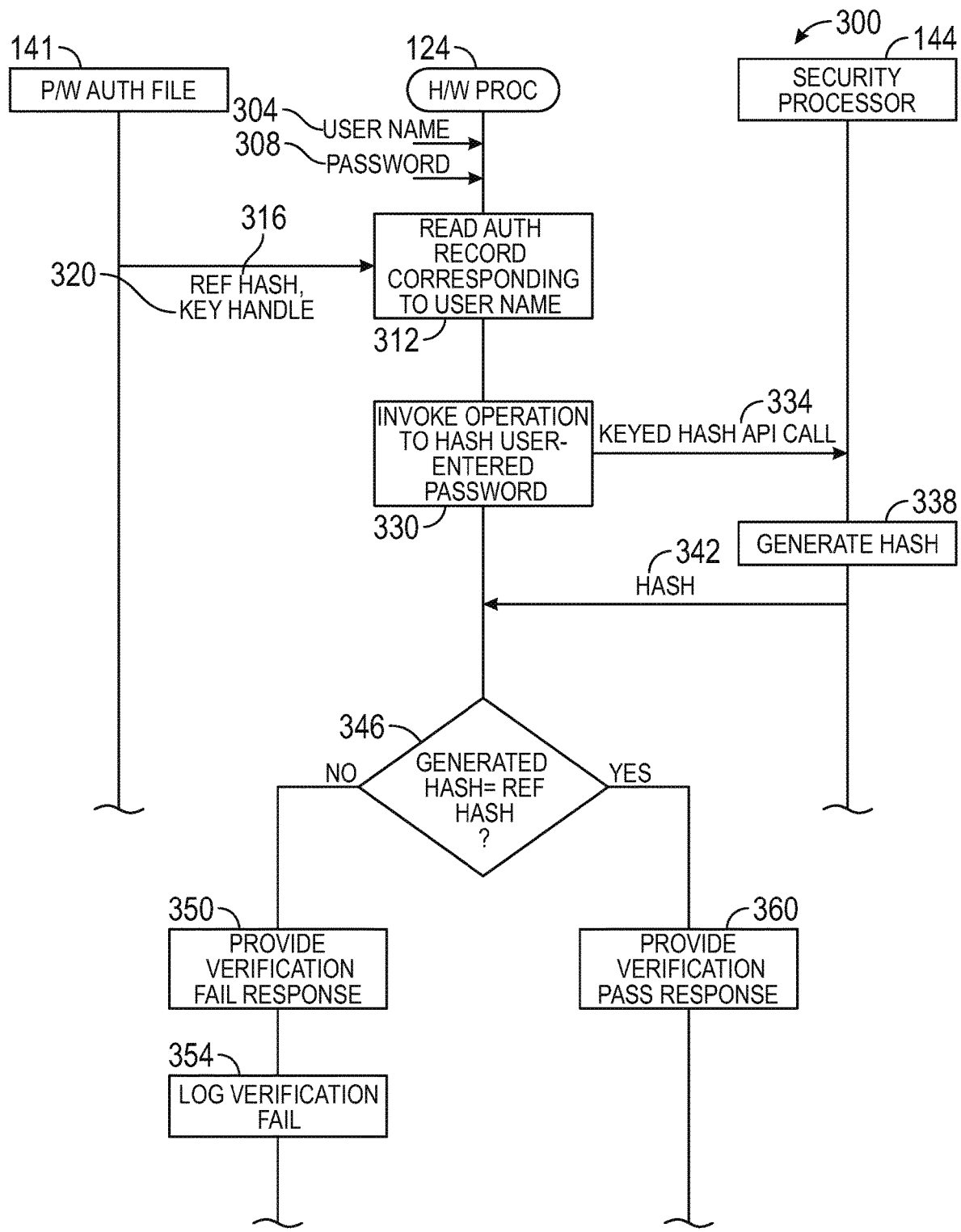
FIG. 3 is a flow sequence diagram depicting communications and actions of a hardware processor and a security processor to authenticate a password using a cryptographic key handle-based password authentication record according to an example implementation.

FIG. 3 is a sequence flow diagram 300 depicting a sequence of actions and communications involved in authenticating a password in accordance with example implementations. FIG. 3 specifically depicts actions and communications associated with a hardware processor 124 and a security processor 144. In an example, to perform the actions and undergo the communications, the hardware processor 124 may execute machine-readable instructions that are associated with a password authentication engine, such as the password authentication engine 168 of FIG. 1.

Referring to FIG. 3, pursuant to the sequence flow diagram 300, the hardware processor 124 accesses a user name 304 and a password 308 for verification. In an example, the user name 304 and the password 308 may be associated with a password verification request. As depicted at 312, the hardware processor 124 may read data from an authentication record of a password authentication file 141, which corresponds to the user name. As depicted in FIG. 3, this data may represent a reference hash 316 and a key handle 320 for the password that is associated with the user account.

As depicted at 330, the hardware processor 124 may invoke a keyed-hashing operation of the security processor 144 to apply a keyed-hash algorithm to an input corresponding to the password 308 and the cryptographic key referenced by key handle 320. This operation produces a reference hash 342, which may then be compared to the reference hash 316 for purposes of verifying the password 308. For purposes of generating the hash 342, the hardware processor 124 may provide a keyed-hash API call 334 to the security processor 144. In an example, assuming that the security processor 144 processes requests in accordance with the TPM 2.0 Specification, the API call 334 may be a TPM2_HMAC( ) API call that passes the password 308 as an argument and passes the corresponding authentication value, the key handle 320 and a cryptographic hashing algorithm identification as options. As depicted at 338, the security processor 144, responsive to the API call 334, performs the keyed-hashing operation and returns the hash 342 in a corresponding API response.

The hardware processor 124 may then determine, as depicted at 336, whether the hash 342 matches the reference hash 316. If the hashes do not match, then the hardware processor 124 may then provide one or multiple responsive actions, including providing a verification fail response (as depicted at 350) and logging the verification fail, as depicted at 354. If, as depicted at 346, the hardware processor 124 determines that the hashes match, then the hardware processor 124 may, as depicted at 360, provide a verification pass response.

Figure 4:
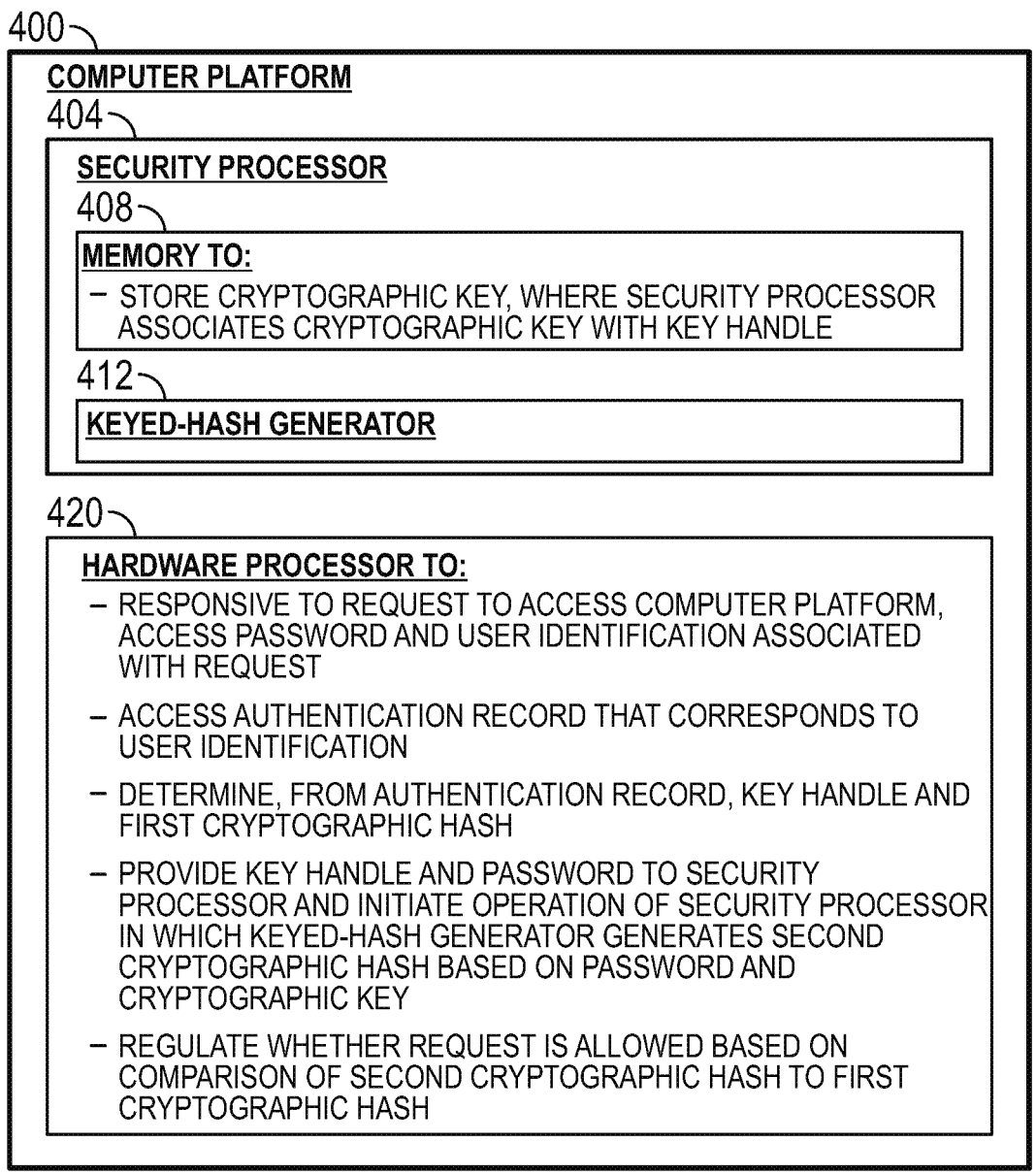
FIG. 4 is a block diagram of a computer platform that authenticates a password using a cryptographic key handle-based password authentication record according to an example implementation.

Referring to FIG. 4, a computer platform 400 includes a security processor 404 and a hardware processor 420. The security processor 404 includes a memory 408 and a keyed-hash generator 412. The memory 408 stores a cryptographic key, and the security processor 404 associates the cryptographic key with a key handle. In an example, the security processor may be a trusted platform module (TPM). In an example, the security processor 404 may comply with the TPM 2.0 Specification. In an example, the security processor 404 may be a physical hardware component that is mounted to a motherboard of the computer platform 400. In an example, the security processor 404 may be a virtual component. In an example, the security processor 404 may be a component that is implemented in firmware. In an example, the memory 408 may be an NVRAM. In an example, the keyed-hash generator 412 may be configured to apply a secure hash algorithm version 2 (SHA-2). In an example, the cryptographic key may be persisted in the security processor 404. In an example, the key handle may be a persistent key handle.

The hardware processor 420, responsive to a request to access the computer platform 400, accesses a password and a user identification associated with the request. In an example, the request may be generated by a program that executes on the computer platform 400. In an example, the program may be a utility program. In an example, the program may be an application. In an example, the program may be launched in response to a command that is submitted to an operating system of the computer platform 400. In an example, the request may originate from another computer platform that is remotely disposed with respect to the computer platform 400. In an example, the request may be associated with a server daemon that executes on the computer platform 400 and communicates with a remote client. The hardware processor 420 further accesses an authentication record that corresponds to the user identification. In an example, the authentication record may be an entry of a password authentication file. In an example, the password authentication file may be a LINUX shadow file. In an example, the user identification may be a user name.

The hardware processor 420 determines, from the authentication record, a key handle and a first cryptographic hash. In an example, the authentication record may be an entry of a text file, and the hardware processor 420 determining the key handle and the first cryptographic hash may include the hardware processor 420 reading the entry from the text file. In an example, the first cryptographic hash may be a reference, or expected, hash for a password associated with the user identification. In an example, the authentication record may contain data corresponding to information other than the key handle and the first cryptographic hash. In an example, the other information may include privileges associated with the user identification. In an example, the other information may include a usage limit associated with the user identification. In an example, the other information may include a time-based limit associated with the user identification. In an example, the other information may be an indicator whether the password is valid. In another example, the other identification may be a validity period or expiration period for the password.

The hardware processor 420 provides the key handle and the password to the security processor 404 and initiates an operation of the security processor 404 in which the keyed-hash generator 412 generates a second cryptographic hash based on the password and the cryptographic key. In an example, the hardware processor 420 may provide an API call to the security processor 404 because the keyed hash generator 412 of the security processor 404 to generate the second cryptographic hash. In an example, the hardware processor 420 may pass the key handle as a parameter of the API call. As an example, the hardware processor 420 may pass the password as an argument of the API call. In an example, the hardware processor 420 may pass, as a parameter of the API call, an identification of a hash algorithm to be used by the keyed hash generator 412. In an example, the security processor 404 may return the second cryptographic hash in an API response to the API call.

The hardware processor 420 regulates whether the request is allowed based on a comparison of the second cryptographic hash to the first cryptographic hash. In an example, the hardware processor 420 may deny the request responsive to the first cryptographic hash being different from the second cryptographic hash. In an example, the hardware processor 420 may regulate access to resources of the computer platform 400 responsive to a determination of whether the second cryptographic hash matches the first cryptographic hash. In an example, the hardware processor 420 may, responsive to determining that the second cryptographic hash is the same as the first cryptographic hash, determine a level of access to resources of the computer platform 400 based on one or multiple other criteria. In an example, the criteria may include one or multiple permissions or privileges associated with the user identification.

Referring to FIG. 5, in accordance with example implementations, a non-transitory machine-readable storage medium 500 stores machine-readable instructions 504. The instructions 504, when executed by a network device, cause the network device to, responsive to the creation of a password for a user identification, store a cryptographic key in a security processor of the network device and determine a handle used by the security processor to reference the cryptographic key. In an example, the network device may be a network switch. In an example, the network device may be a managed network device. In an example, the instructions 504, when executed by the network device, cause the network device to provide an API call to the security processor to import the cryptographic key into the security processor. In an example, the API call may cause the security processor to load the cryptographic key as a transient object and provide a transient handle to the transient object as a returned output responsive to the API call. In an example, the instructions 504 may cause the network device to provide an API call to the security processor to cause the security processor to persist the cryptographic key. In an example, the security processor may respond to an API call to persist the cryptographic key by returning a persistent key handle, which corresponds to the handle used by the security processor to reference the cryptographic key. In an example, the instructions 504 may cause the network device to perform one or multiple actions to generate the cryptographic key. In an example, the instructions 504 may cause the network device to provide an API call to the security processor to cause the security processor to generate a random number and return the random number as part of an API response to the API call. In an example, the network device may use the returned random number as the cryptographic key.

The instructions 504, when executed by the network device, further cause the network device to access a reference cryptographic digest determined based on the cryptographic key and the password and create an authentication record corresponding to the user identification. In an example, the cryptographic digest may be determined based on the application of a keyed-hash algorithm that has an input derived from the cryptographic key and the password. In an example, the keyed-hash algorithm may be an HMAC algorithm. In an example, the authentication record may be an entry of a shadow file.

The instructions 504, when executed by the network device, further cause the network device to store, in the authentication record data, representing the user identification, the reference cryptographic digest and the handle. The instructions 504, when executed by the network device, further cause the network device to, responsive to a request that is associated with the user identification to access the network device, access the authentication record and process the request based on the reference cryptographic digest and the handle. In an example, processing the request may include verifying a password associated with the request based on the reference cryptographic digest and the handle. In an example, processing the request may include verifying the password and further evaluating one or multiple other criteria regulating a degree of access. In an example, the criteria may include a privilege associated with a user name. In an example, a criteria may include a usage limit associated with a user account. In an example, processing the request may include denying the request responsive to failure to verify a password based on a reference cryptographic digest and the handle.

Figure 6:
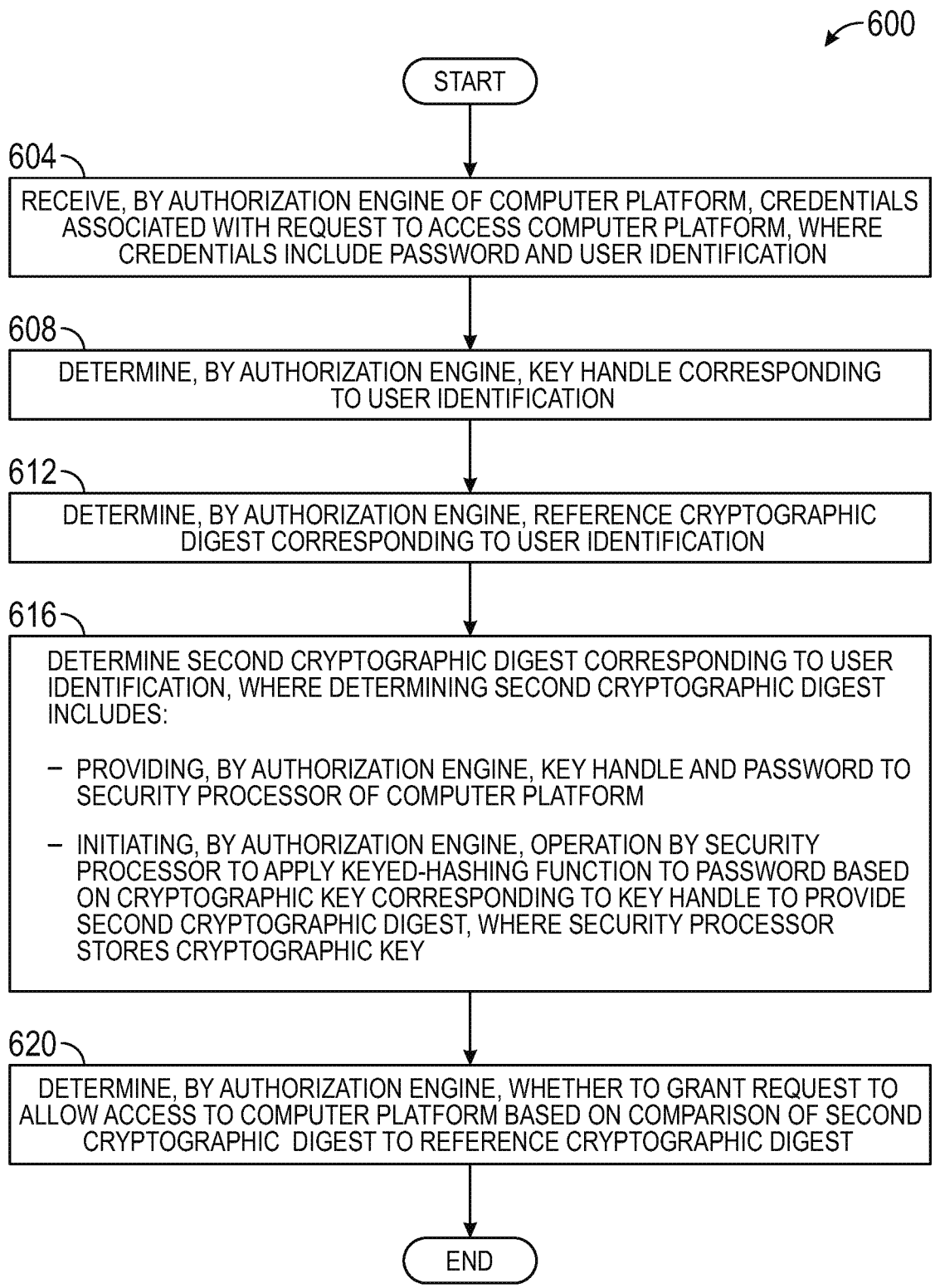
FIG. 6 is a flow diagram depicting a process to authenticate a password using a cryptographic key handle-based password authentication record according to an example implementation

Referring to FIG. 6, in accordance with example implementations, a process 600 includes receiving (block 604) by an authorization engine of a computer platform, credentials that are associated with a request to access the computer platform. The credentials include a password and a user identification. The process 600 includes determining (block 608), by the authorization engine, a key handle that corresponds to the user identification and determining (block 612) by the authorization engine, a reference cryptographic digest that corresponds to the user identification. In an example, determining the key handle includes identifying an authentication record that corresponds to the user identification and reading data from the authentication record corresponding to the key handle. In an example, determining the reference cryptographic digest includes identifying an authentication record that corresponds to the user identification and reading data from the authentication record corresponding to the reference cryptographic digest. In an example, the authentication record may be one of a plurality of entries of a shadow file. In an example, authorization engine may be a pluggable authentication module (PAM). In an example, the user identification may be a user name.

The process 600 includes determining (block 616) a second cryptographic digest corresponding to the user identification. Determining the second cryptographic digest includes providing, by the authorization engine, the key handle and the password to a security processor of the computer platform; and initiating, by the authorization engine, an operation by the security processor to apply a keyed-hashing function to the password based on a cryptographic key that corresponds to the key handle to provide the second cryptographic digest. The security processor stores the cryptographic key. In an example, the security processor may be a hardware component. In another example, the security processor may be a virtual component. In another example, the security processor may be a component that is implemented in firmware. In an example, the security process may be a trusted platform module (TPM) configured to perform trusted computing operations according to the TPM 2.0 Specification. In an example, the security processor may include a keyed-hash generator. In an example, the keyed-hash generator may be constructed to apply a secure hash algorithm version 2 (SHA-2). In an example, the cryptographic key may be persisted in the security processor. In an example, the key handle may be a persistent key handle.

The process 600 includes regulating (block 620), by the authorization engine, access to the computer platform based on a comparison of the second cryptographic digest to the reference cryptographic digest. In an example, regulating access to the computer platform includes regulating access to resources of the computer platform. In an example regulating access to the computer platform includes allowing or denying access the computer platform. In an example, regulating access to the computer platform includes allowing access, based on a result of the comparison of the second cryptographic digest to the reference cryptographic digest, and further regulating a degree of the access based on one or multiple other criteria, such as a privilege associated with the user identification or a resource usage limit.

In accordance with example implementations, the hardware processor, in response to a creation of the password, initiates an operation of the security processor to load an object into the secure storage and pass the cryptographic key to the operation as the object. A particular advantage is that password-related information may be generated, stored and accessed in a secure manner that may not be compromised by security attacks, such as dictionary-based attacks and rainbow table-based attacks.

In accordance with example implementations, the operation of the security processor to load the object into to the secure storage causes the security processor to designate the cryptographic key as a transient object and return a transient handle that the security processor associates with the cryptographic key. A particular advantage is that password-related information may be generated, stored and accessed in a secure manner that may not be compromised by security attacks, such as dictionary-based attacks and rainbow table-based attacks.

In accordance with example implementations, the hardware processor further initiates an operation of the security processor to cause the security processor to designate the cryptographic key as a persistent object and return a persistent handle that the security processor associates with the cryptographic key. The hardware processor stores the persistent handle in the authentication record as the key handle. A particular advantage is that password-related information may be generated, stored and accessed in a secure manner that may not be compromised by security attacks, such as dictionary-based attacks and rainbow table-based attacks.

In accordance with example implementations, the security processor further includes a random number generator. The hardware processor further, in response to a creation of the password, initiates an operation of the security processor in which the random number generator generates a number. The hardware processor further, in response to creation of the password, designates the number as the cryptographic key, initiates an operation of the security processor to load an object into the secure storage, and passes the cryptographic key as the object to the operation to load the object into the secure storage. A particular advantage is that password-related information may be generated, stored and accessed in a secure manner that may not be compromised by security attacks, such as dictionary-based attacks and rainbow table-based attacks.

In accordance with example implementations, the hardware processor to further, responsive to the password changing to a second password, provide the key handle and the second password to the security processor and initiate an operation of the security processor in which the keyed-hash generator generates a third cryptographic hash based on the second password and the cryptographic key. The hardware processor to further, responsive to the password changing to the second password, modify the authentication record responsive to the password changing, including replacing the first cryptographic hash with the third cryptographic hash. A particular advantage is that password-related information may be generated, stored and accessed in a secure manner that may not be compromised by security attacks, such as dictionary-based attacks and rainbow table-based attacks.

In accordance with example implementations, the security processor includes a trusted platform module (TPM). A particular advantage is that password-related information may be generated, stored and accessed in a secure manner that may not be compromised by security attacks, such as dictionary-based attacks and rainbow table-based attacks.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A computer platform comprising:
   a security processor comprising:
      a memory to store a cryptographic key, wherein the security processor associates the cryptographic key with a key handle; and
      a keyed-hash generator; and
   a hardware processor to:
      responsive to a request to access the computer platform, access a password and a user identification associated with the request;
      access an authentication record that corresponds to the user identification;
      determine, from the authentication record, a key handle and a first cryptographic hash;
      provide the key handle and the password to the security processor and initiate an operation of the security processor in which the keyed-hash generator generates a second cryptographic hash based on the password and the cryptographic key; and
      regulate whether the request is allowed based on a comparison of the second cryptographic hash to the first cryptographic hash.

2. The computer platform of claim 1, wherein the hardware processor to further, in response to a creation of the password:
   initiate an operation of the security processor to load an object into the secure storage; and
   pass the cryptographic key to the operation as the object.

3. The computer platform of claim 2, wherein the operation of the security processor to load the object into the secure storage causes the security processor to designate the cryptographic key as a transient object and return a transient handle that the security processor associates with the cryptographic key.

4. The computer platform of claim 3, wherein the hardware processor to further:
   initiate an operation of the security processor to cause the security processor to designate the cryptographic key as a persistent object and return a persistent handle that the security processor associates with the cryptographic key; and
   store the persistent handle in the authentication record as the key handle.

5. The computer platform of claim 1, wherein:
   the security processor further comprises a random number generator;
   the hardware processor to further, in response to a creation of the password:
      initiate an operation of the security processor in which the random number generator generates a number;
      designate the number as the cryptographic key;
      initiate an operation of the security processor to load an object into the secure storage; and
      pass the cryptographic key as the object to the operation to load the object into the secure storage.

6. The computer platform of claim 1, wherein the hardware processor to further, responsive to the password changing to a second password:
   provide the key handle and the second password to the security processor and initiate an operation of the security processor in which the keyed-hash generator generates a third cryptographic hash based on the second password and the cryptographic key; and
   modify the authentication record responsive to the password changing, including replacing the first cryptographic hash with the third cryptographic hash.

7. The computer platform of claim 1, wherein the security processor comprises a trusted platform module (TPM).

* * * * *